(12) United States Patent
Janssen et al.

(10) Patent No.: US 11,378,130 B2
(45) Date of Patent: Jul. 5, 2022

(54) GUIDE CARRIAGE FOR A ROUTE GUIDE, ROUTE GUIDE HAVING THE GUIDE CARRIAGE AND METHOD FOR ESTABLISHING A LOAD OF THE GUIDE CARRIAGE

(71) Applicant: Robert Bosch GmbH, Stuttgart (DE)

(72) Inventors: Christoph Janssen, Wuerzburg (DE); David Krampert, Bamberg (DE); Lucas Guendert, Volkach-Astheim (DE); Sebastian Unsleber, Arnstein (DE)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 16/731,511

(22) Filed: Dec. 31, 2019

(65) Prior Publication Data

US 2020/0232513 A1 Jul. 23, 2020

(30) Foreign Application Priority Data

Jan. 23, 2019 (DE) .................... 10 2019 200 780.5

(51) Int. Cl.
*F16C 41/00* (2006.01)
*G01L 5/00* (2006.01)
*F16C 29/06* (2006.01)

(52) U.S. Cl.
CPC .......... *F16C 41/00* (2013.01); *F16C 29/0604* (2013.01); *G01L 5/0019* (2013.01); *F16C 2202/36* (2013.01); *F16C 2233/00* (2013.01)

(58) Field of Classification Search
CPC .. F16C 29/0604; F16C 41/00; F16C 2202/36; F16C 2233/00; G01L 5/0019
See application file for complete search history.

(56) References Cited

U.S. PATENT DOCUMENTS

| 7,444,888 | B2 * | 11/2008 | Mol | G01L 5/0019 73/862.322 |
|---|---|---|---|---|
| 10,151,654 | B2 * | 12/2018 | Bluemm | F16C 29/0645 |
| 2016/0123304 | A1 * | 5/2016 | Kibsgaard | F16C 25/06 416/1 |
| 2020/0124091 | A1 * | 4/2020 | Unno | F16C 29/0647 |

FOREIGN PATENT DOCUMENTS

| DE | 102 43 095 B4 | 7/2004 |
|---|---|---|
| DE | 102 53 178 B4 | 8/2004 |
| DE | 10 2016 210 109 A1 | 12/2017 |

* cited by examiner

*Primary Examiner* — Alan B Waits
(74) *Attorney, Agent, or Firm* — Maginot, Moore & Beck LLP

(57) ABSTRACT

There is disclosed a guide carriage for roller-mounted guiding on a guide rail having at least one carriage roller track on which roller members which can be arranged between guide carriages and a guide rail can be rolled, wherein the carriage roller track, in particular in order to establish a load acting on the guide carriage or wear, is associated with a pressure-sensitive sensor device which can be loaded by the roller members and which has sensors which are arranged in a manner distributed in the rolling direction and which in order to evaluate the sensor signals thereof can be connected in terms of signaling to an evaluation device. There are further disclosed a route guide having such a guide carriage and a method for establishing the load on the guide carriage.

11 Claims, 6 Drawing Sheets

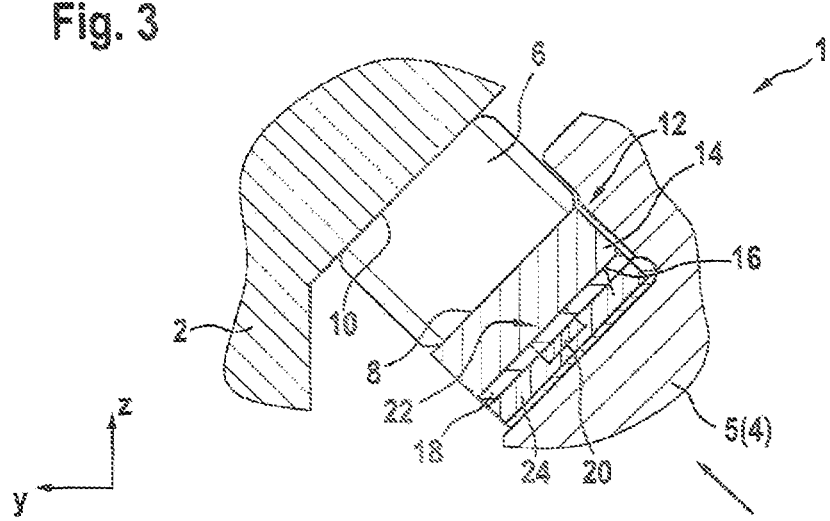
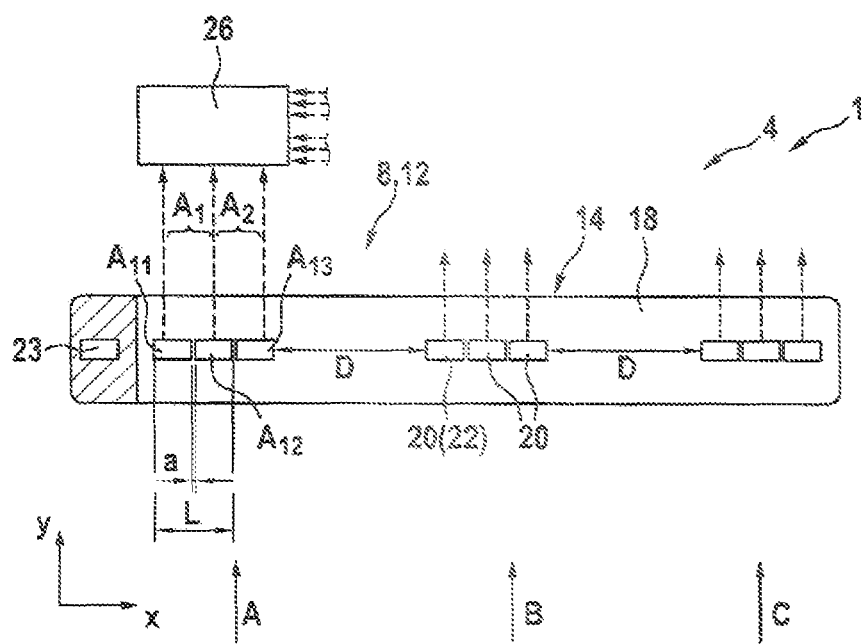

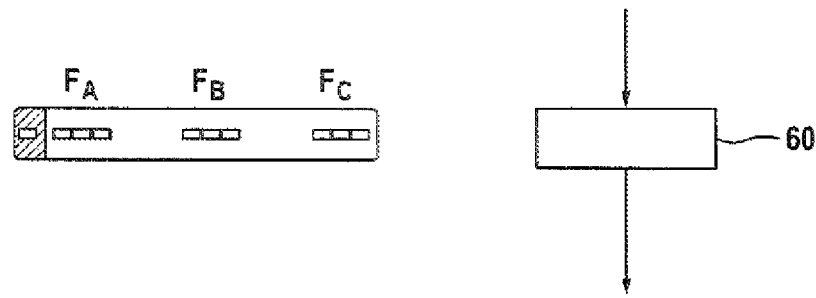
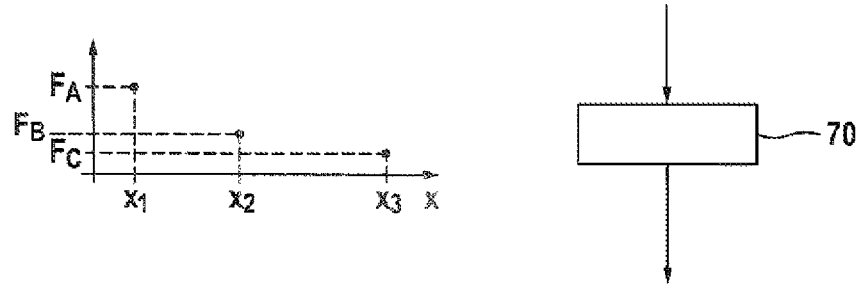
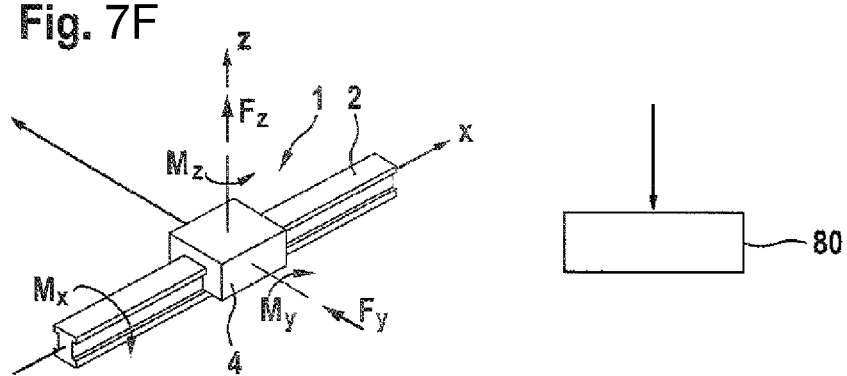

GUIDE CARRIAGE FOR A ROUTE GUIDE, ROUTE GUIDE HAVING THE GUIDE CARRIAGE AND METHOD FOR ESTABLISHING A LOAD OF THE GUIDE CARRIAGE

This application claims priority under 35 U.S.C. § 119 to application no. DE 10 2019 200 780.5, filed on Jan. 23, 2019 in Germany, the disclosure of which is incorporated herein by reference in its entirety.

TECHNICAL FIELD

The disclosure relates to a guide carriage, a route guide, and a method for establishing a load of the guide carriage.

BACKGROUND

A route guide, in particular a linear guide, enables a translational, guided movement. To this end, it has a generally fixed guide rail or a fixed guiding profile, on which a guide carriage is mounted on roller members.

DE 10 2016 210 109 A1 from the Applicant discloses a guide carriage for a linear roller bearing, or a linear guide, having a sensor layer which is arranged on a track insert. Via the sensor layer, loads on the guide carriage can be measured. The structure is such that piezoresistive thin layer sensors are arranged on a steel insert of a roller bearing. In this instance, for example, nickel-containing, diamond-like hydrocarbons Ni-DLC or doped silicon are proposed as materials. Piezoresistive materials have the advantage of a high sensitivity to expansion so that an extension of the sensor in the measurement direction can be accordingly short.

The DLC sensor layer used has a high temperature sensitivity which is discussed, for example, in the specification DE 102 53 178 B4. This temperature influence has to be compensated for in order to obtain meaningful measurements. Furthermore, this type of sensor layer is not only sensitive with respect to the force introduced by the roller members into the track, but instead also with respect to any deformation of the guide carriage or the track insert. The deformation of the guide carriage and other unknown influences consequently potentially contribute to measurement inaccuracies. These also have to be compensated for in a complex manner.

The specification DE 102 43 095 D4 sets out a roller bearing with an integrated piezoresistive sensor system. In this instance, a piezoresistive intermediate layer which is contacted locally by electrodes is incorporated between bearing shell portions. The local measurement cross-section of the respective piezoresistive sensor element is determined over the cross-section of the electrodes. By spacing the electrodes apart along the roller path, the loading of the roller path can be measured at several locations.

At least in order to compensate for the temperature influence mentioned, solutions are known from the prior art, in which a sensor which cannot be loaded by roller members is placed outside the roller path as a reference so that the temperature influence can be calculated using it.

SUMMARY

In this regard, objects of the disclosure are to provide a guide carriage for a linear roller bearing, and a linear roller bearing having the guide carriage, which are configured in such a manner that, when the load of the guide carriage is measured, the compensation of disturbance variables is carried out with little technical device complexity. An object of the disclosure is also to provide a method for establishing a loading on the guide carriage with such compensation.

The first object is achieved with a guide carriage having the features of the disclosure, the second by a route guide or a linear roller bearing having the features of the disclosure and the third by a method having the features of the disclosure.

Developments of the respective disclosure are described in the embodiments in each case.

A guide carriage for roller-mounted guiding on a guide rail, in particular to form a linear roller bearing, has at least one carriage roller track on which roller members which can be arranged between guide carriages and a guide rail can be rolled. The carriage roller track, in particular in order to establish a load acting on the guide carriage or wear, is associated with a pressure-sensitive sensor device which can be loaded by the roller members and which has sensors which are arranged in a manner distributed in the rolling direction. In order to evaluate the individual sensor signals thereof and consequently to establish the load or the wear, the sensors can be connected or are connected in terms of signaling to an evaluation device. According to the disclosure, the sensor device has at least one tuple comprising at least two, preferably three, sensors. From these, sensors which are directly sequential in the rolling direction each form a sensor pair. With two sensors, consequently, one sensor pair, with three sensors two sensor pairs. The respective sensor pair is according to the disclosure configured in such a manner that, at least in the event of an eccentric loading in the rolling direction, portions of the sensor signals thereof which are dependent on disturbance variables are identical, in particular almost identical, and load-dependent portions of these signals are different, in particular significantly different.

In this manner, the guide carriage is configured in such a manner that, depending on a paired operation or calculation of the sensor signals, the disturbance variable-dependent portions can be eliminated in the simplest manner possible since their difference may amount to zero or almost zero. The load to be established can thus be established from a result of this operation or calculation without additional apparatuses or devices in order to compensate for the influence of disturbance variables.

Preferably, the respective sensor pair is configured in such a manner that a difference of the disturbance variable-dependent portions is of a lesser order of magnitude than a difference of the load-dependent portions.

Preferably, this embodiment of the sensor pair is produced by means of a sizing of the sensors thereof and their arrangement with respect to each other, in particular in the rolling direction.

Preferably, an extent of the sensors of the sensor pair and their spacing with respect to each other are sized in the rolling direction in such a manner that the load of the individual roller member on these sensors is significantly different.

The load may be a force acting on the guide carriage and/or a torque. It is also possible to establish from the sensor signals a speed, an acceleration of the guide carriage and/or a pitting of the carriage roller track, the roller members or a rail roller track. A disturbance variable may be a deformation of the guide carriage or the carriage roller track or the influence of the temperature.

The guide carriage is preferably constructed in such a manner that it has a main member on which a roller track insert which has the carriage roller track is arranged. In particular, the roller track insert is arranged on the main member in a materially engaging and/or positive-locking and/or frictionally engaging and/or non-positive-locking manner.

Preferably, the guide carriage has a plurality of, in particular four, carriage roller tracks which are provided with a sensor system according to the disclosure. These tracks are preferably combined at the inner side on the guide carriage to form two roller track pairs which are arranged opposite each other. The roller tracks of the respective roller track pair are preferably positioned relative to each other.

In a development, a first calculation of the sensor signals per sensor pair is provided, in accordance with which the load can be established.

In a particularly preferred development, the first calculation is a difference or differential formation of the sensor signals per sensor pair, or at least has it. Since the disturbance variable-dependent portions of the sensor signals are identical or almost identical, they disappear to zero or almost zero. In other words, the influence of the disturbance variables can be eliminated in this manner.

In order to determine a position of the roller members relative to the sensors, which is in principle necessary in order to determine a force acting overall on the guide carriage, at least three sensors and accordingly at least two sensor pairs are provided in the tuple. Accordingly, the first calculation also has at least two differences as a result. In a development, therefore, there is provided a second calculation of the differences per tuple, in accordance with which the load can be established.

In a development, a third calculation of results of the first calculation and/or second calculation per roller track is/are provided, in accordance with which the load can be established.

Preferably, the guide carriage has the evaluation device and the sensors are connected thereto in terms of signaling in order to evaluate their sensor signals.

In a development, at least the first calculation or the calculations to be carried out is/are stored and/or connected in the evaluation device.

In order to estimate the load, an expanded Kalman filter based on the first, second and/or third calculation to be carried out is preferably stored and/or connected in the evaluation device.

In a particularly preferred manner, the respective sensor pair is configured in such a manner that the extent thereof in a rolling direction is adapted to a roller member diameter. In this instance, the extent is in particular less than or equal to the roller member diameter.

Particularly in the case of the development with three sensors in the tuple, an extent of the respective sensor pair in the rolling direction is preferably sized in such a manner that a spacing from center points of the outermost of the three sensors in the rolling direction is less than a roller member diameter.

Preferably, the pressure-sensitive sensor device, in particular the respective sensor, is constructed in a piezoresistive or piezoelectric manner.

In this instance, the sensors each have one electrode, of which one piezoresistive layer which can be loaded by the roller member is contacted. A single extent of the respective sensor in the rolling direction is in this instance determined by a diameter of the electrode thereof in this direction. Preferably, the sensors are identical to each other, in particular their electrodes have the same cross-sections.

A piezoresistive layer may be individually associated with the respective electrode, or a plurality or all of the electrodes contact together a piezoresistive layer. The layer preferably extends in a rolling direction at least along the sensor device of the respective roller track.

For additional compensation of the influence of a variable temperature on the establishment, which may be small according to the disclosure but which is nonetheless still present, there is provided in a development a sensor which is arranged remote from the roller track and which is consequently not loaded by the roller members and whose sensor signal can be calculated by the evaluation device.

A route guide, in particular linear guide or a linear roller bearing, has an extending guide, in particular a guide rail, and a guide carriage which is supported thereon and which can be moved in the extent direction and which is configured according to at least one aspect of the above description. From the carriage roller tracks and guide roller tracks of the guide, in particular four roller track pairs are formed, wherein roller members are arranged so as to be able to roll between each carriage roller track and guide roller track.

A method for establishing a load of a guide carriage of a route guide which is configured according to the above description has according to the disclosure a step "First calculation of sensor signals of a sensor pair from sensors which are directly sequential in the rolling direction". In particular, the first calculation serves to establish a difference of the sensor signals and from that to establish a load force per sensor pair.

In a development, the method for establishing the load has a step "Second calculation of results of the first calculation per tuple". It is thus possible in particular to establish a load force per tuple.

In a development, the method for establishing the load has a step "Third calculation of results of the first calculation and/or second calculation per roller track. This can be followed by a step "Establishing a load profile per roller track".

In a development of the method, the establishment of the load has a step "Establishing a load vector, in particular a force and/or torque vector, from the load profiles".

BRIEF DESCRIPTION OF THE DRAWINGS

An embodiment of a route guide according to the disclosure or a guide carriage according to the disclosure and a method are illustrated in the drawings. With reference to the Figures of these drawings, the disclosure will now be explained.

In the drawings:

FIG. 3 shows a detail of the route guide according to FIG. 2 in the region of a roller bearing, FIG. 4 is a plan view of a roller track with a sensor system of the route guide according to the previous Figures, FIG. 7D shows a fourth part of the method for establishing a load of the guide carriage, FIG. 7E shows a fifth part of the method for establishing a load of the guide carriage, FIG. 7F shows a sixth part of the method for establishing a load of the guide carriage.

DETAILED DESCRIPTION

Figure 1:
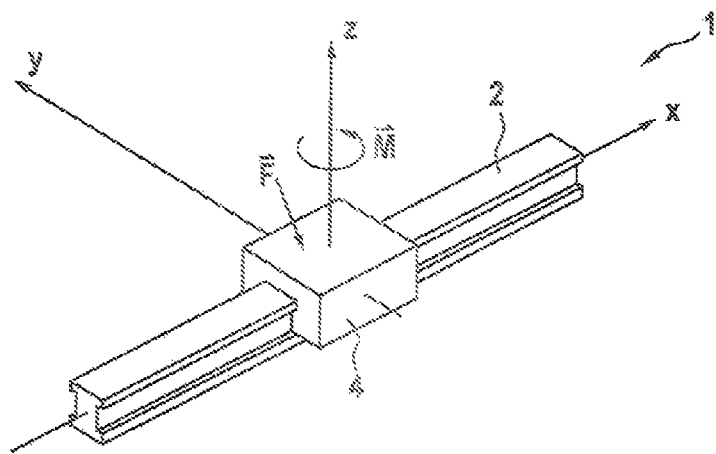
FIG. 1 shows an embodiment of a route guide with a guide rail and guide carriage which is roller-mounted thereon.

According to FIG. 1, a route guide 1 has a guide 2 which is constructed as a rail and on which a guide carriage 4 is roller-mounted. An extent direction, and consequently guiding and rolling direction, is designated x, a vertical axis of the guide carriage 4 is designated z and the transverse axis thereof is designated y. The guide carriage 4 is guided on the guide 2 in a linearly movable manner. A force F and a torque M are indicated by way of example as a load acting on the guide carriage 4.

Figure 2:
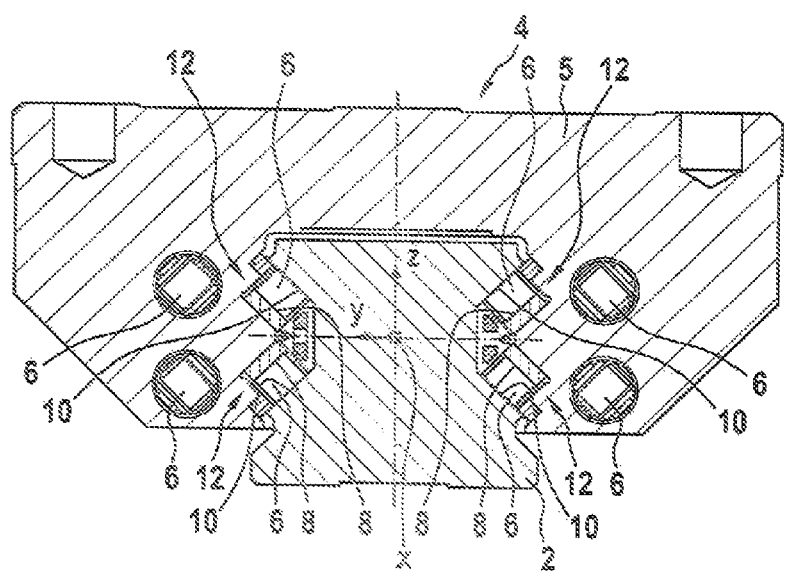
FIG. 2 shows a cross-section of the route guide according to FIG. 1.

FIG. 2 shows a section of the route guide 1 according to FIG. 1 which is guided in a y-z plane. According to FIG. 2, the guide carriage 4 has four rows of continuously revolving roller members 6 which in the embodiment are constructed in the manner of rollers. A different shape of the roller members, for example, a spherical shape, and a different number of rows are of course possible. At the guide carriage side, the roller members 6 roll on a carriage roller track 8 and at the guide or rail side on a rail roller track 10 so as to transmit loads. The guide 2 extends in an x direction with a constant outer cross-section. It preferably comprises steel and is hardened at least in the region of the rail tracks 10.

The respective carriage roller track 8 is formed by the surface of a roller track insert 12 which faces the guide 2 and which is adhesively bonded at the rear side to a main member 5 of the guide carriage 4. Alternatively, their non-positive-locking/frictionally engaging and/or positive-locking arrangement on the main member 5 is possible. The carriage roller tracks 8 can naturally also be formed integrally with the main member 5. The route guide 1 is in this instance constructed largely in accordance with the teaching of the specification EP 2 110 571 B1.

FIG. 3 shows a detail of the cross-section according to FIG. 2 in the region of the roller bearing of the guide carriage 4 on the guide 2, that is to say, the roller member 6. A base member 14 of the roller track insert 12 has a rear support face 16. It is coated with a piezoresistive layer 18 which comprises amorphous hydrocarbon, in particular DLC (diamond like carbon). The thickness of the layer 18 is, for example, 6 μm, wherein it is illustrated excessively in bold in FIG. 2 for the sake of clarity. Electrodes 20 contact the layer 18. Each of the electrodes 20 together with the cross-section of the piezoresistive layer 18, which is contacted by it and which is illustrated with broken lines, thus forms a piezoresistive sensor 22. The entire layered structure of the roller track insert is covered by an electrically insulating covering layer 24.

The arrangement of the electrodes 20 along the carriage roller track 12 is shown in FIG. 4. In this instance, a plan view (cf directional arrow, FIG. 3 bottom right) of the piezoresistive layer 18 contacted by the electrodes 20 is selected, wherein the illustration of the main member 5 and the covering layer 24 is omitted.

The arrangement and the geometric cross-section of the electrodes 20 determine in this instance the arrangement and the geometric cross-section of the sensors 22 of the roller track insert 12, or carriage roller track 8 according to FIG. 3. According to the disclosure, the electrodes 20 are combined in 3 tuples A, B, C which are identical to each other. The 3 tuples A, B, C have a spacing D with respect to each other. Inside the respective 3 tuples A, B, C, two directly sequential sensors 22 or electrodes 20 are constructed identically and arranged with spacing a with respect to each other which is illustrated in FIG. 4 to an excessively large scale.

Furthermore, the route guide 1 according to FIG. 4 has an evaluation device 26 which is arranged in particular close to the sensors, in particular on the guide carriage 4, and to which the individual sensors 22 are connected in terms of signaling. This signal connection is indicated by means of dashed signal lines.

In the evaluation device 26, the sensors 22 of the tuples A, B, C are connected to form sensor pairs $A_i$, $B_i$, $C_i$, whose sensors are arranged in each case directly one after the other in the x direction. For the tuple A, for example, the sensor pairs $A_1$ and $A_2$ are thus produced. The designation of the sensor pairs $B_i$, $C_i$ has been omitted in FIG. 4 for reasons of clarity.

The sensor pairs $A_i$, $B_i$, $C_i$, for example, the pair $A_1$, have in the rolling direction x a respective extent L and a respective spacing a of their two sensors 22. These two geometric variables L, a are thus adapted to a diameter of the roller member 6 in such a manner that in the case illustrated (with three sensors 22 per tuple A, B, C) all three centers of the sensors 22 are located between line contacts of two adjacent roller members 6 with the roller track 8 thereof, on which they roll. These two roller members 6 have from each other the spacing of their roller member diameter.

Sensor signals R of the sensors 22 brought about by perpendicular application of force of the roller member 6 vary very significantly with the position of the roller member 6 in the rolling direction x. If, for example, the sensor pair $A_1$ according to FIG. 4 is loaded in an eccentric manner by a roller member 6, for example, when the line contact is located directly perpendicularly above the center of the sensor 22 with the smallest x coordinate—referred to as $A_{11}$—the load-dependent portions of the sensor signals of the sensor pair $A_1$—thus of the sensors $A_{11}$, $A_{12}$ thereof—are substantially different, their difference is thus significant.

Figure 5:
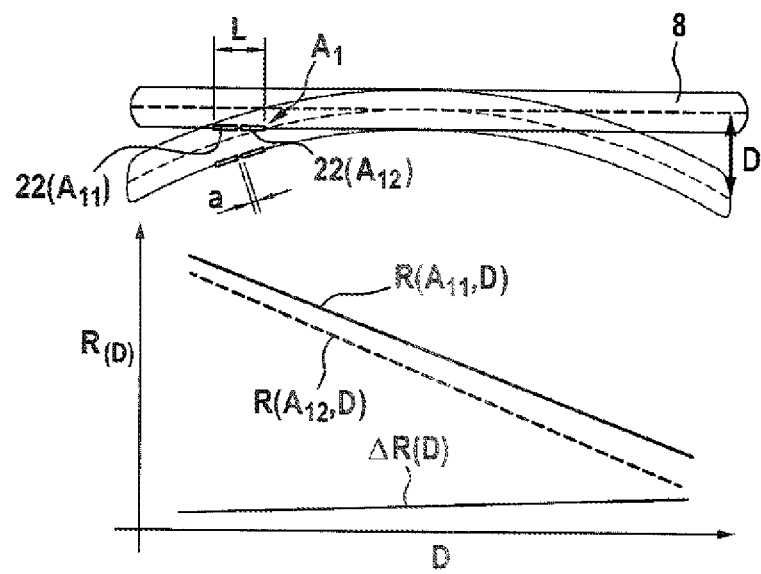
FIG. 5 is a graphic illustration of sensor signals and the calculation thereof in accordance with a deformation of the roller track.
Figure 6:
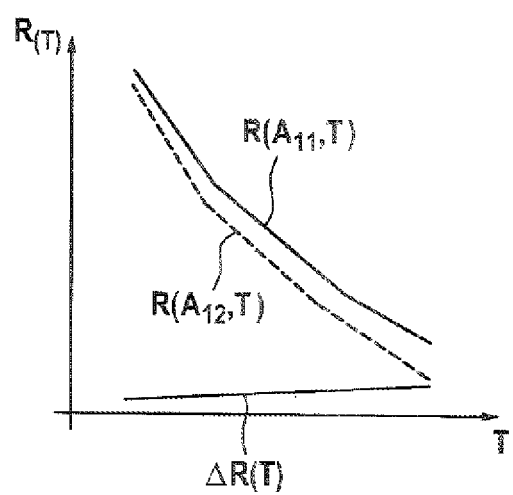
FIG. 6 is a graphic illustration of sensor signals and the calculation thereof in accordance with the temperature.

It is a different situation with the portions of the sensor signals which result from the disturbance variables deformation D and temperature T. Characteristic lines of the sensors $A_{11}$, $A_{12}$ of the sensor pair $A_1$ relating to this are illustrated in FIGS. 5, 6. As a result of the very small spacing a of the sensors $A_{11}$, $A_{12}$ and the extent L of the sensor pair $A_1$ adapted to the roller member diameter, the temperature T and deformation D acting on the sensors 22 thereof ($A_{11}$, $A_{12}$) are in each case almost identical. The disturbance variable-dependent characteristic lines R(T), R(D) of the sensor signals of the identically configured sensors 22 ($A_{11}$, $A_{12}$) therefore provide almost identical sensor signals $R(A_{11}, D)$, $R(A_{12}, D)$, $R(A_{11}, T)$, $R(A_{12}, T)$. Their paired calculation, in particular differential formation, then provides an almost constant differential signal $\Delta R(D)$, $\Delta R(T)$.

As a result of the sensors 22 which are paired, in particular in a tuple-like manner, according to the disclosure, and which are sized and spaced apart and by means of the paired calculation of the sensor signals of directly adjacent sensors 22, the influences of the disturbance variables D, T can consequently be suppressed since the differential signal $\Delta R(D)$, $\Delta R(T)$ thereof has been found to be almost constant in accordance with the respective disturbance variable D, T. An additional temperature compensation can be achieved by means of a sensor 23 which is arranged outside the layer 18, in a region of the roller track 8 which cannot be loaded by the roller members.

Sensor signals $R_i$ of the sensors 22 can be considered in a first approximation to be linearly dependent on the acting load F, M. Roller members 6 move over the individual sensors 22 and have a spacing which substantially corresponds to the roller member diameter thereof, in particular is slightly larger than it. This is a result of the fact that a length of the roller member revolution is slightly larger than a sum of the roller member diameters, which results in empty space in the roller member revolution, for which reason the spacings between the individual roller members 6 are adjusted depending on the installation situation and load. Periodic sensor signals $R_i$ are produced at the sensors 22.

A position P of the roller member 6 is then described completely with a respective smallest absolute spacing of a roller member center with respect to the respective sensor center and is consequently always located between the negative and the positive roller member radius. As already mentioned, the respective sensor signal $R_i$ is heavily dependent on the disturbance variable temperature T. For each sensor 22 of the tuple A, B, C there is consequently a sensor signal $R_i$ which is dependent on the temperature T, the position P of the roller member 6, the deformation-dependent tensions $\sigma_x$ and $\sigma_z$, and the load-dependent tension $\sigma_y$.

Figure 7A:
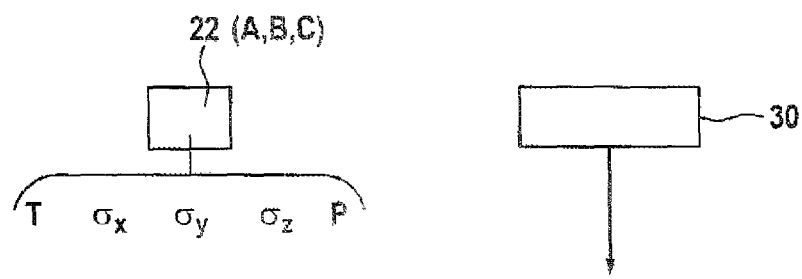
FIG. 7A shows a first part of a method for establishing a load of the guide carriage.
Figure 7B:
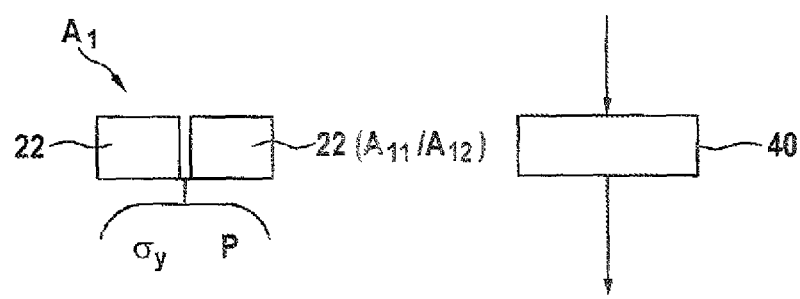
FIG. 7B shows a second part of the method for establishing a load of the guide carriage.
Figure 7C:
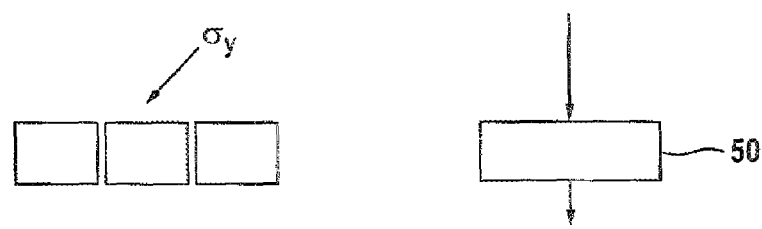
FIG. 7C shows a third part of the method for establishing a load of the guide carriage.

In the method according to FIGS. 7A to 7F, there is, as shown in FIG. 7A, therefore firstly a step "Establishing sensor signals $R_i$ (T, P, $\sigma_x$, $\sigma_y$, $\sigma_z$) of the sensors 22 of the tuples A, B, C" 30. In a following step shown in FIG. 7B, "First calculation" 40, the differential signals of the sensor signals according to the above description are formed in pairs, whereby the disturbance variable-dependent influences T, $\sigma_x$, and $\sigma_z$ (deformation D) drop out. In a step shown in FIG. 7C, "Second calculation" 50, the differential formation of the results of the first calculation 40 is carried out, whereby for the tuples A, B, C, which have at least three sensors 22, the position P of the roller member 6 can be established. In a step shown in FIG. 7D, "Third calculation" 60, for the tuples A, B, C the respective force $F_A$, $F_B$, $F_C$ is established and in a step 70, shown in FIG. 7E, a load profile F(x) which is dependent on the rolling direction x is produced. When the method mentioned is carried out for all the carriage roller tracks 8 according to FIG. 2, from the load profiles according to FIG. 7E a force and torque profile of the guide carriage 4 according to FIG. 7F in relation to the main axes x, y, z can be produced. This is carried out in step 80.

Figure 8:
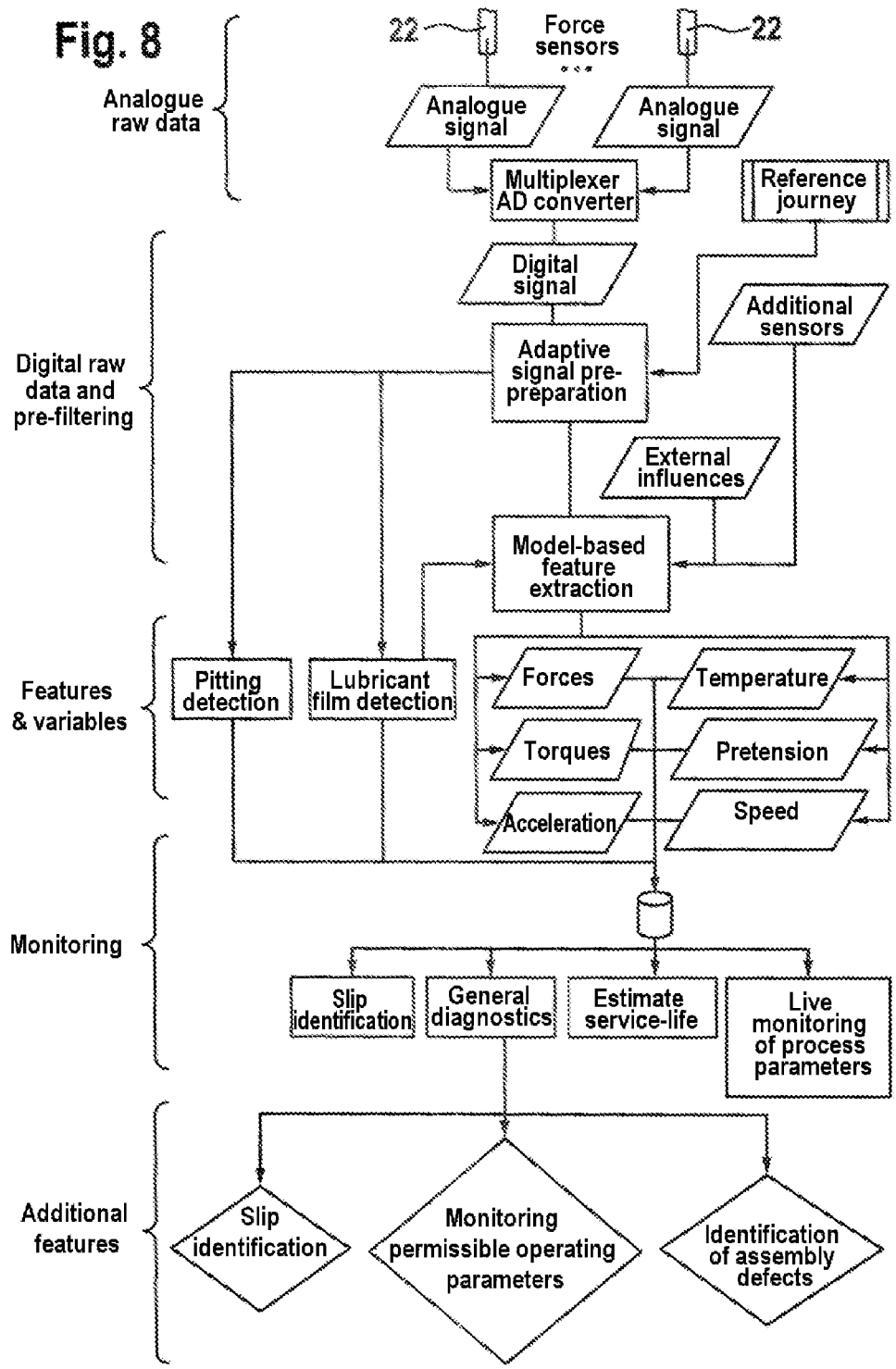
FIG. 8 shows a meta method for monitoring the route guide in accordance with the sensor signals of the sensor system configured according to the disclosure.

The above description relates to establishing the load, for example, in the context of a load vector, in particular a force and/or torque vector, of the guide carriage. FIG. 8 shows a meta method, in which the above-described method is embedded, wherein also the meta method is based on the sizing and configuration of the sensor system according to the disclosure—sensor tuples of closely spaced sensors and sensor pairs.

Firstly, via the electronic system which is close to the sensors, the current resistance values of the force sensors 22 are determined. One or more multiplexers in front of an AD converter—or the converter—switches the sensor which is intended to be detected next to the AD converter. The digital data thereof are captured by a signal processing module.

This additionally involves the possibility, by means of a reference journey of the guide carriage 4 on the rail 2, of verifying the calibration of the sensors 22 from the adjusted pretensioning. In addition, this module contains a component which scans the digital raw signal for potential pittings. This takes place prior to a temporal filtering of the signal in order to detect the potentially very short but large signal pulses by means of rolled-over particles and breakage onsets. In addition, this module contains another component determined based on the ohmic resistance between the lower force sensor plane and the guide rail, the lubrication film between the roller member 6 and the rail 2 and the guide carriage 4.

A module "Model-based feature extraction" contains a physical model which represents a connection between the sensor signal and the variables of force, torque, temperature and pretensioning which are intended to be determined. The variables of the model which are intended to be determined overall form a state. The description of this state is achieved, for example, by means of a digital particle filter. This contains an estimation of the current state of the system, predicts a future state and corrects this prediction with the next sensor data set in each case. It is thereby possible to combine the measurement data of the different individual sensors 22 from a data set, and to take into account the results from previous measurement data sets. All information from the available data are used to increase the precision of the complex state model. The precision is limited when considering the individual sensors 22 in isolation, for example, by means of noise and the very high level of precision of temperature compensation which is required.

The model for feature extraction additionally takes into account external influences during the calculation, such as, for example, the ambient temperature. It is also possible to process at this location data of additional external sensors, for example, acceleration sensors, gyroscope, temperature or the like, in order to gain better knowledge of the environment of the guide carriage 4.

After the adaptive signal processing and the feature extraction, the following features of variables are present: occurrence of pittings or rolling over of particles and breakage onsets as a result of occurrences of wear; indications relating to the presence of a lubrication film between the carriage, roller member and rail; forces acting on the carriage; torques acting on the carriage; temperature of the carriage; pretensioning of the carriage; acceleration of the carriage; speed of the carriage. These variables and features are further used by the following modules: estimation of service-life; live surveillance and monitoring of the process parameters; general diagnostics. The service-life estimation is carried out based on the historical load values which are recorded and stored close to the sensors together with the pitting detection and the determination of the pretensioning. From these parameters, assuming that the carriage in future is subjected to the same average loading as before, the remaining service-life is estimated. The module live monitoring reports all relevant parameters externally to the communication partners of the sensor system, this may, for example, be a machine control, a cloud application or a device of another type. The parameters to be transmitted can in this instance be configured. The General Diagnostics module monitors the correct operation of the guide carriage. In this instance, the following parameters are verified for magnitudes in accordance with specifications: temperature, load, torque, acceleration, speed, incorrect assembly of the rail or the guide carriage. Based on the data for lubricant film detection and the current acceleration and the speed, the slip identification module provides an indication of possible slippage of the roller members. These data can also be incorporated in the service-life calculation.

There is disclosed a guide carriage for roller-mounted guiding on a rail of a linear guide having a roller track with which there are associated pressure-sensitive sensors which can be loaded by roller members and which each have a sensor signal and which are constructed in the rolling direction in pairs and are so closely spaced apart that a differential signal of the sensor signals which can be established in pairs is significantly load-dependent, but independent—or at least almost independent—of disturbance variables, such as, for example, a deformation of the guide carriage or a temperature.

There are further disclosed a route guide therewith, and a method for establishing the load which is based on a differential formation of the sensor signals in order to eliminate the disturbance variable influence.

LIST OF REFERENCE NUMERALS

1 Route guide
2 Guide
4 Guide carriage
5 Main body of guide carriage
6 Roller member
8 Carriage roller track
10 Rail roller track
12 Roller track insert
14 Base member of roller track insert
16 Support face
18 Piezoresistive layer
20 Electrode
22 Loadable sensor
23 Non-loadable sensor
24 Covering layer
26 Evaluation device
30 Detection sensor signal
40 First calculation
50 Second calculation
60 Third calculation
70 Establishing load profile
80 Establishing load vector
x Rolling, guide direction
L Extent of sensor pair
a Spacing of directly adjacent sensors
A,B,C Sensor tuple
$A_1$ 1st Sensor pair tuple A
$A_2$ 2nd Sensor pair tuple A
$A_{11}$ 1st sensor in 1st sensor pair
$A_{12}$ 2nd sensor in 1st sensor pair/1st sensor in 2nd sensor pair
$A_{22}$ 2nd sensor in 2nd sensor pair
F Load force
M Load torque
D Disturbance variable deformation
T Disturbance variable temperature
$R_1$ Sensor signal
$\Delta R$ Difference of sensor signals

What is claimed is:

1. A guide carriage for roller-mounted guiding on a guide rail, the guide carriage comprising:
   at least one carriage roller track configured to enable rolling of roller members that are arranged between the guide carriage and the guide rail; and
   a pressure-sensitive sensor device associated with the at least one carriage roller track and configured to be loaded by the roller members and to determine a load or wear acting on the guide carriage, the pressure-sensitive sensor device having a plurality of sensors arranged in a distributed manner in a rolling direction of the guide carriage, the plurality of sensors being connected so as to provide sensor signals thereof to an evaluation device,
   wherein the plurality of sensors of the pressure-sensitive sensor device include at least one tuple of sensors that are directly sequential in the rolling direction and form at least one sensor pair that is configured such that, during an eccentric loading of the at least one sensor pair in the rolling direction, portions of the sensor signals of the at least one sensor pair that are dependent on disturbance variables are substantially identical, and portions of the sensor signals of the at least one sensor pair that are load-dependent are different, and
   wherein the at least one sensor pair is configured such that an extent thereof in a rolling direction is less than or equal to a diameter of the roller members.

2. The guide carriage according to claim 1, wherein the evaluation device is configured to determine the load by calculating the sensor signals per sensor pair.

3. The guide carriage according to claim 2, wherein the evaluation device is configured to determine the load by calculating a difference of the sensor signals per sensor pair.

4. The guide carriage according to claim 3, wherein the evaluation device is configured to determine the load by calculating differences of the sensor signals per tuple.

5. The guide carriage according to claim 4, wherein the evaluation device is configured to determine the load by calculating, per roller track, results of at least one of (i) the sensor signals per sensor pair and (ii) the differences of the sensor signals per tuple.

6. The guide carriage according to claim 2, wherein at least one of (i) results of calculating the sensor signals per sensor pair and (ii) results of further calculations to be carried out are at least one of stored and connected in the evaluation device.

7. A method for establishing a load of a guide carriage of a route guide, the route guide including (i) an extending guide having at least one guide roller track and (ii) the guide carriage that is supported on the extending guide and can be moved in an extending direction of the extending guide, the guide carriage including at least one carriage roller track paired with the at least one guide roller track and configured to enable rolling of roller members that are arranged between the least one carriage roller track and the at least one guide roller track, the guide carriage including a pressure-sensitive sensor device associated with the at least one carriage roller track and configured to be loaded by the roller members and to determine a load or wear acting on the guide carriage, the pressure-sensitive sensor device having a plurality of sensors arranged in a distributed manner in a rolling direction of the guide carriage, the plurality of sensors being connected so as to provide sensor signals thereof to an evaluation device, the plurality of sensors of the pressure-sensitive sensor device including at least one tuple of sensors that are directly sequential in the rolling direction and form at least one sensor pair that is configured such that, during an eccentric loading of the at least one sensor pair in the rolling direction, portions of the sensor signals of the at least one sensor pair that are dependent on disturbance variables are substantially identical, and portions of the sensor signals of the at least one sensor pair that are load-dependent are different, the method comprising:
   calculating the sensor signals per sensor pair of directly sequential sensors;

determining, for each roller track, a respective load profile; and determining a load vector based on the load profiles of the roller tracks.

8. The method according to claim 7
wherein the step of calculating the sensor signals includes calculating the sensor signals per sensor pair, per tuple.

9. The method according to claim 8
wherein the step of calculating the sensor signal includes at least one of (i) calculating, per roller track, results of the sensor signals per sensor pair and (ii) calculating, per roller track, the sensor signals per tuple.

10. A guide carriage for roller-mounted guiding on a guide rail, the guide carriage comprising:
at least one carriage roller track configured to enable rolling of roller members that are arranged between the guide carriage and the guide rail; and
a pressure-sensitive sensor device associated with the at least one carriage roller track and configured to be loaded by the roller members and to determine a load or wear acting on the guide carriage, the pressure-sensitive sensor device having a plurality of sensors arranged in a distributed manner in a rolling direction of the guide carriage, the plurality of sensors being connected so as to provide sensor signals thereof to an evaluation device,
wherein the plurality of sensors of the pressure-sensitive sensor device includes at least one tuple of sensors having three sensors that are directly sequential in the rolling direction and form two sensor pairs that are each configured such that, during an eccentric loading of each pair of sensors of the respective two sensor pairs in the rolling direction, portions of the sensor signals of each of the respective pair of sensors of the two sensor pairs that are dependent on disturbance variables are substantially identical, and portions of the sensor signals of each of the respective pair of sensors of the two sensor pairs that are load-dependent are different.

11. A guide carriage for roller-mounted guiding on a guide rail, the guide carriage comprising:
at least one carriage roller track configured to enable rolling of roller members that are arranged between the guide carriage and a guide rail; and
a pressure-sensitive sensor device associated with the at least one carriage roller track and configured to be loaded by the roller members and to determine a load or wear acting on the guide carriage, the pressure-sensitive sensor device having a plurality of sensors arranged in a distributed manner in a rolling direction of the guide carriage, the plurality of sensors being connected so as to provide sensor signals thereof to an evaluation device,
wherein the plurality of sensors of the pressure-sensitive sensor device include at least two tuples of sensors arranged spaced apart from each other along an extent of the roller track, each tuple of sensors of the at least two tuples of sensors being arranged directly sequential in the rolling direction and to form at least one sensor pair that is configured such that, during an eccentric loading of the at least one sensor pair in the rolling direction, portions of the sensor signals of the at least one sensor pair that are dependent on disturbance variables are substantially identical, and portions of the sensor signals of the at least one sensor pair that are load-dependent are different.

* * * * *